Patented Apr. 30, 1940

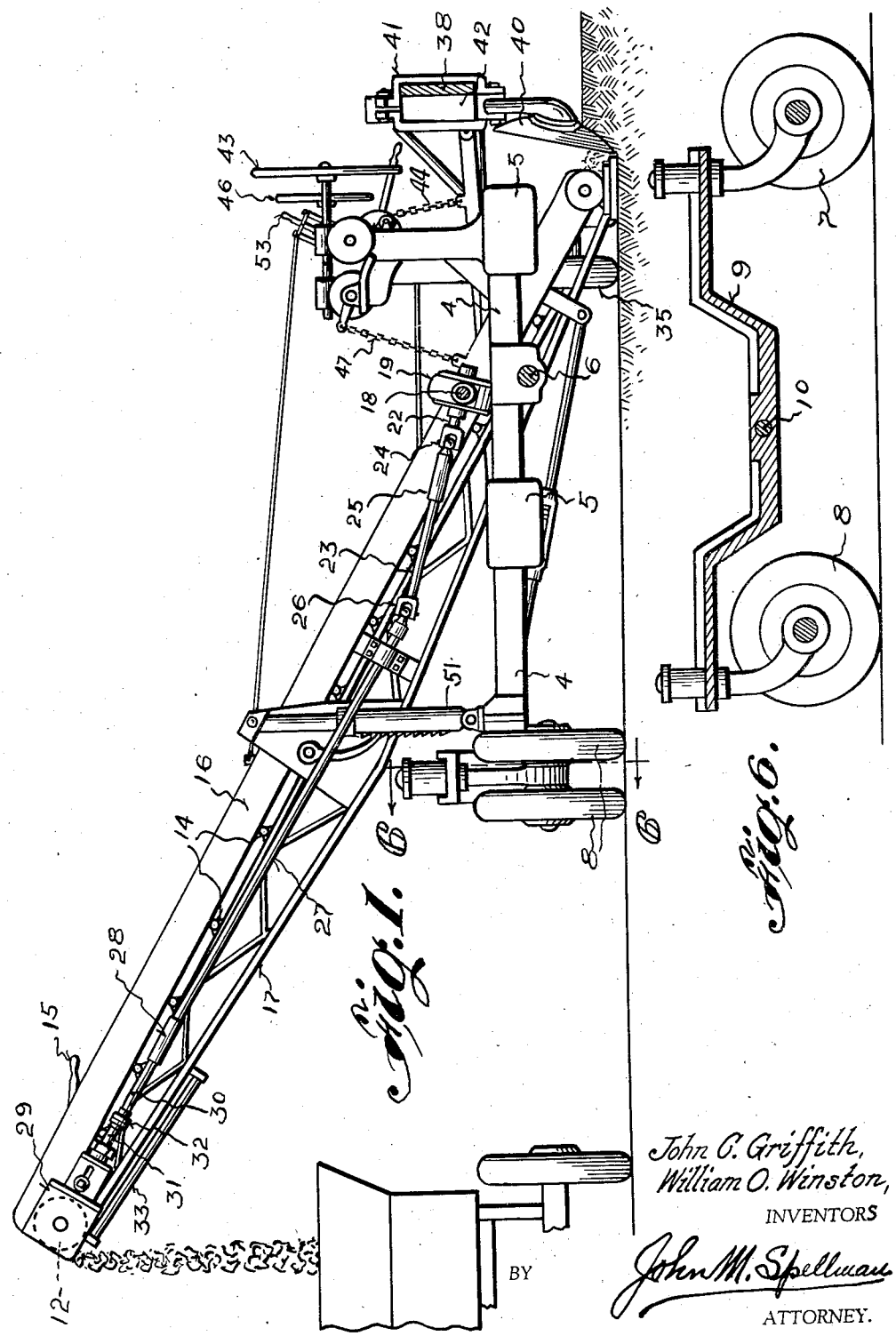

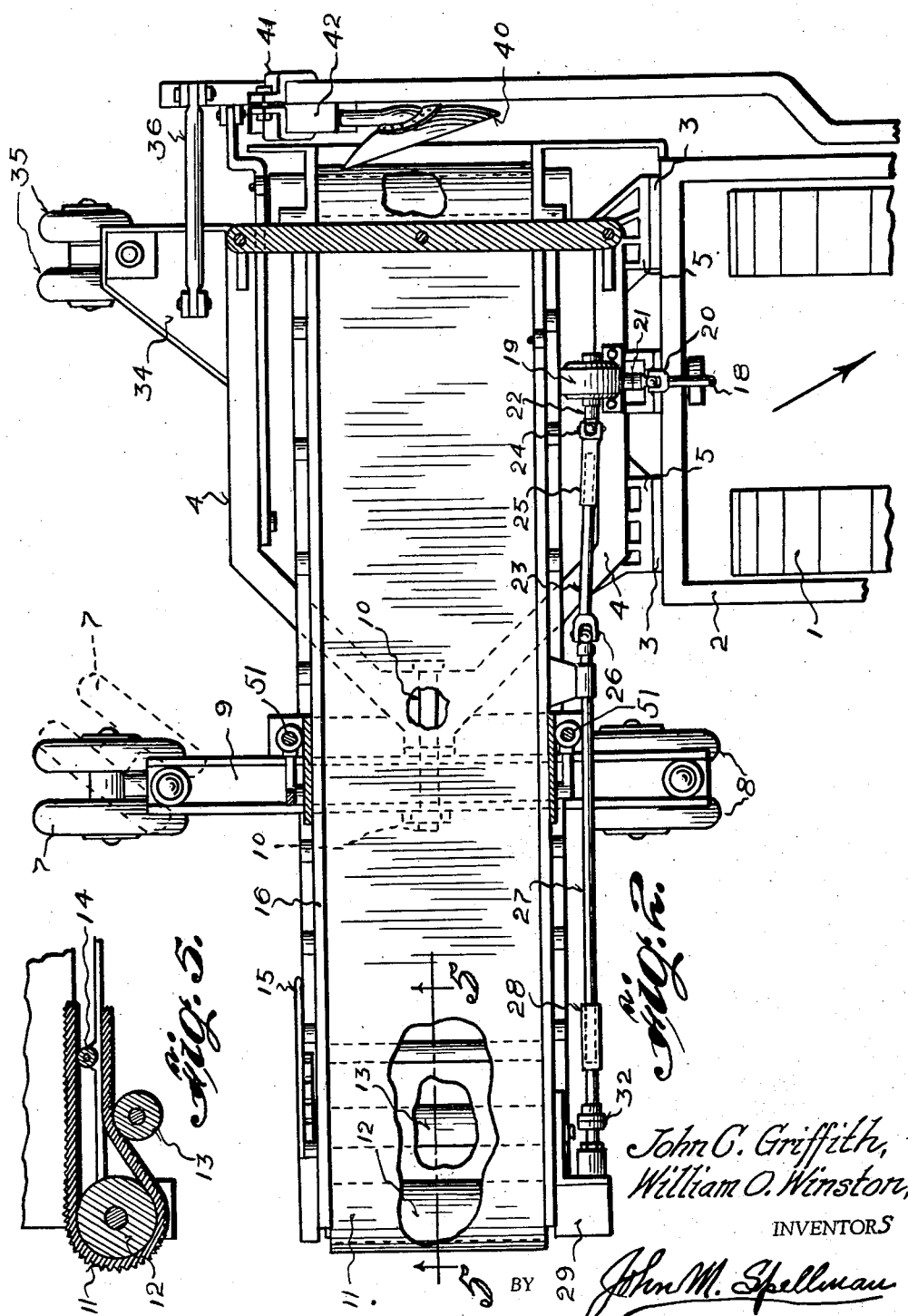

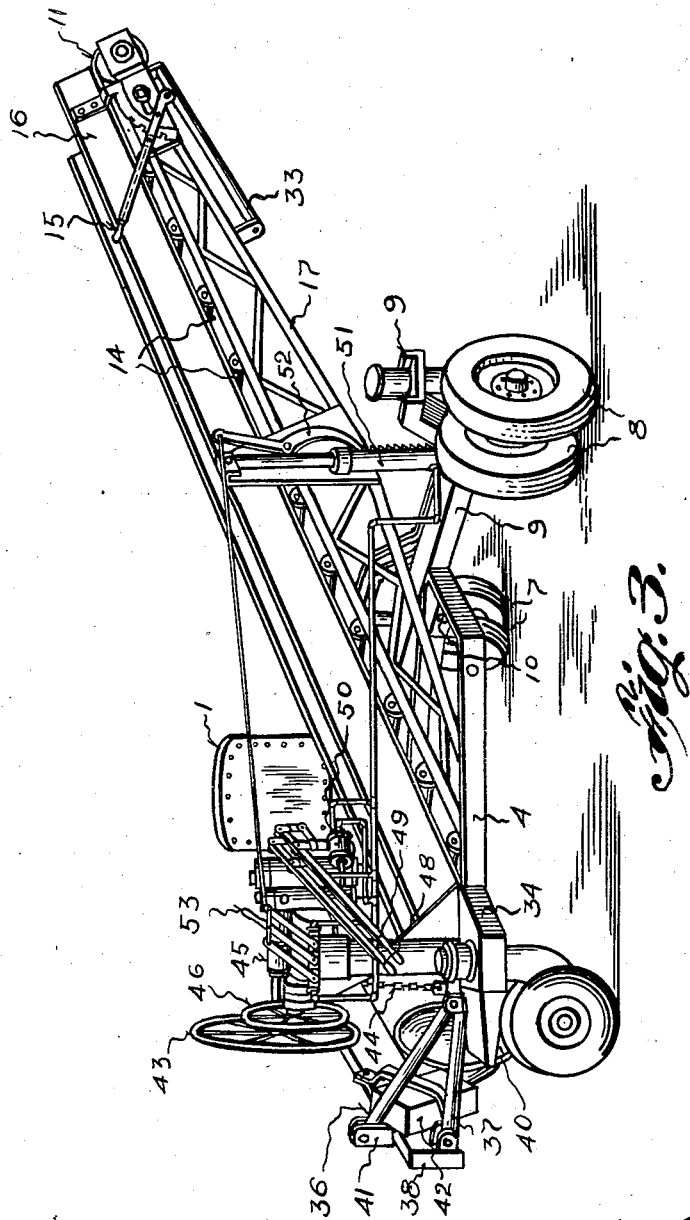

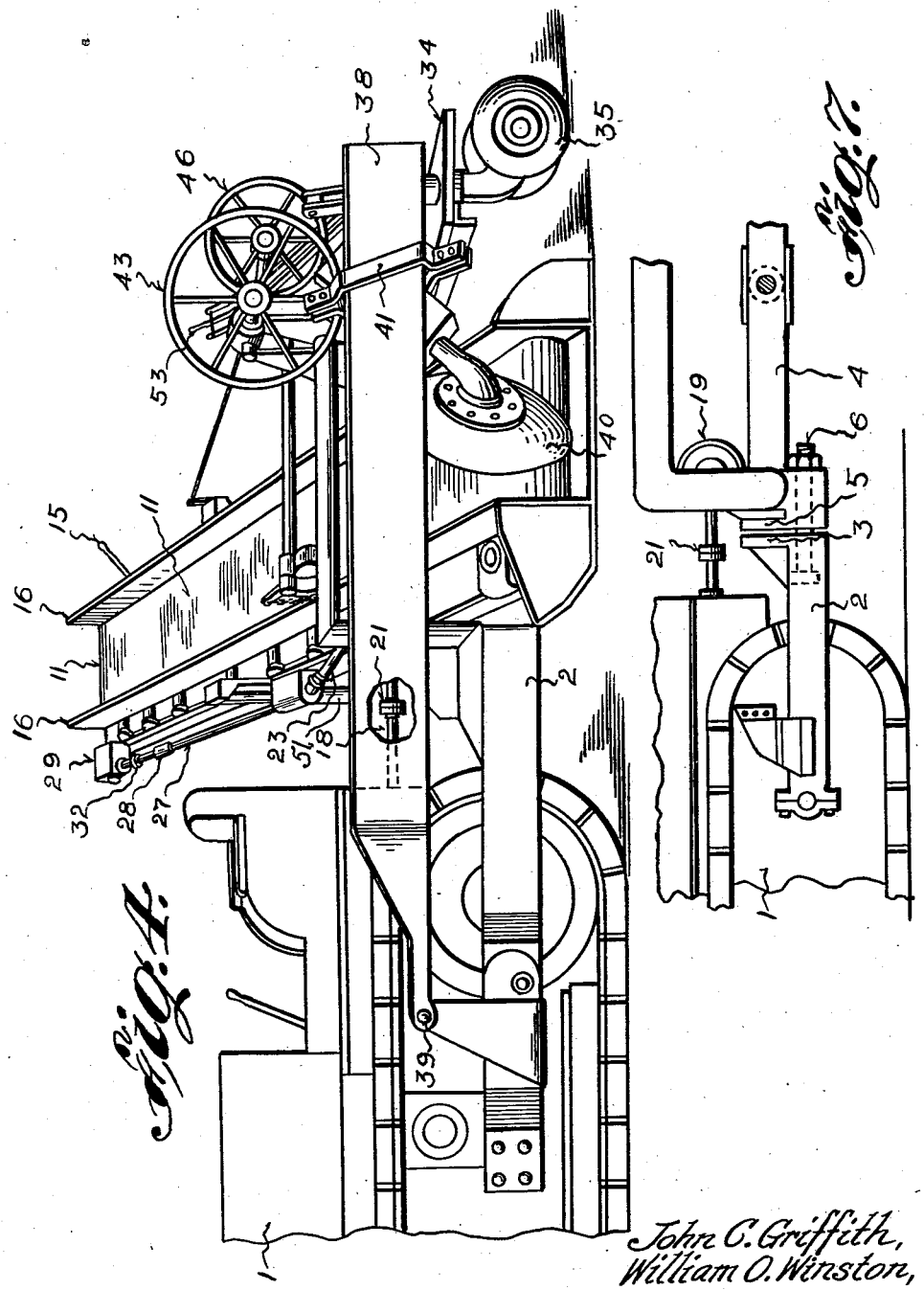

2,199,239

UNITED STATES PATENT OFFICE 2,199,239

ELEVATING GRADER ATTACHMENT FOR CRAWLER TYPE TRACTORS

John C. Griffith and William O. Winston, Dallas, Tex.

Application April 14, 1939, Serial No. 267,858

3 Claims. (Cl. 37—110)

This invention relates to grading machines and it has particular reference to the type of grader which is attached to a tractor of conventional design.

The principal object of the invention is to provide a grader so arranged that when attached to a tractor it is capable of following the path of the tractor even during abrupt turns.

Another object is to provide a grader so arranged that the elevating equipment thereof is driven from the power take-off of the tractor and which driving unit as well as the grader proper may be readily attached or detached from the tractor with a minimum of effort.

Still another object is to provide a coupling between the grader and the tractor which is capable of allowing for pivotal movement in a transverse vertical plane to allow efficient operation as the work progresses over a terrain of varied levels.

Yet another object is to provide a suitable number of castor wheel assemblies so arranged that flexibility in a generally horizontal plane is provided to greatly facilitate smooth and economical operation in turning as mentioned above, also to assist in providing flexibility in a generally vertical plane by means of a pivotal connection to the frame of the grader.

With the foregoing objects as paramount, the invention has particular reference to its salient features of construction and arrangement of parts which will become manifest as the description proceeds taken in connection with the accompanying drawings, wherein, Figure 1 is a view in vertical elevation of the grading machine shown in operative position, Figure 2 is a plan view of the grader, Figure 3 is a perspective view of the machine, Figure 4 is a side elevational view of the grader shown attached to a conventional tractor, Figure 5 is a cross-sectional view of the belt and roller arrangement taken on the line 5—5 on Figure 2, Figure 6 is an elevational view of one of the castor arrangements, Figure 7 is a fragmentary view in elevation of the hitch and showing the connection to the power take-off of the tractor.

Referring to the drawings, the reference numeral 1 denotes a tractor of conventional design. A tractor coupling 2 is secured to the tractor frame and is shaped as best shown in Figure 2. Bumper plates 3 are secured to the coupling 2 and are rigidly braced relative thereto.

The grader frame is comprised primarily of the frame structure 4 which is shaped as best shown in Figures 2 and 3. The frame structure 4 is provided with bumper plates 5 which are normally in alinement with the plates 3 and are held in adjacent relationship by means of a heavy bolt 6. This bolt provides for pivotal movement between the frames 2 and 4. Sliding motion between the bumper plates 3 and 5 results when the bolt 6 serves as a pivot. It will be understood that the bumper plates 3 and 5 are made sufficient in size to provide for their total or partial contact at all times.

A highly important feature of the invention is the castor arrangement. Referring to the drawings it will be seen that the grader is provided with three sets of dual castors. The pairs of castors 7 and 8 are positioned adjacent the ends of a frame structure 9, which latter frame is pivotally connected at 10 to the frame 4. Thus a certain flexibility results enabling the castor assembly to travel over uneven ground without impairing the operation of the grader.

A belt conveyor 11 serves to elevate earth material into a truck as shown in Figure 1. This belt is driven by power from the tractor 1 as will be hereinafter explained, the actuating roller 12, idler roller 13 and small supporting rollers 14 being arranged as best shown in Figure 5. The belt conveyor 11 is tightened to a desired degree by varying the position of the lever 15 best shown in Figure 3. Movement of this lever serves to advance or retract the roller 12, thereby varying the tension of the belt 11.

A guide 16 serves to prevent spilling of the earth material from the belt 11. The elevating assembly is supported by a framework 17.

Power for driving the belt conveyor is supplied by the tractor 1, as shown in Figures 1, 2 and 4. A power take-off 18 is connected to a gear box 19 through a universal joint 20 and a flexible coupling 21. A shaft 22 is connected to a shaft 23 through a universal joint 24 and a spline 25. A universal joint 26 connects the shaft 23 to a shaft 27, which shaft is provided with a spline 28. This spline is connected to a gear box 29 containing bevel gears by means of shafts 30 and 31 which are interconnected by a flexible coupling 32, thus completing the drive to the roller 12.

A protecting roller 33 serves to prevent damage should the elevating equipment accidentally come in contact with the truck being loaded.

A horizontal frame member 34 is rigidly secured to the frame 4 and serves to support the single pair of castors 35. Brace members 36 and 37 serve to support a beam 38 which is pivoted at 39. A disc plow 40 is rigidly secured to the pivoted beam by means of a clamp 41 which clamp is arranged to surround a weight block 42. Raising and lowering of the disc 40 is accomplished manually by rotation of the hand wheel 43, which rotation serves to raise and lower the beam 38, to which the disc 40 is affixed, by reason of the winding or unwinding of a chain or cable 44 upon a drum 45.

A hand wheel 46 is arranged to raise or lower the lower end of the conveyor assembly through the medium of a chain or cable 47. Thus optimum grading of the earth material to the belt conveyor may be maintained by an operator at all times.

The raising and lowering of the upper end of the elevating assembly is preferably accomplished by the hydraulic means illustrated in Figure 3. Raising of the assembly is effected by manually operating the levers or pump handles 48 and 49, normally simultaneously, whereby fluid is forced by pump cylinders 50 into the hydraulic lifts 51 positioned on either side of the elevating equipment. Manually controlled pawls 52 serve to check unbalanced loads on the cylinders 51, and likewise prevent sudden dropping of the belt conveyor assembly in case of leakage caused, for example, by a broken supply line.

Downward movement is effected by means of the release lever 53 which allows return of fluid from the cylinders 51 to storage at a controlled rate, the pawls 52 being released during the operation.

It is obvious that an auxiliary power unit may be mounted at some convenient place on the frame of the grader to serve as a source of power for the belt conveyor. This construction is especially adaptable on larger units wherein the ratio of the power take-off horse power in relation to draw-bar horse power of the tractor is very materially decreased. In such an arrangement the power take-off may be dispensed with.

Manifestly, the construction described and illustrated is capable of considerable modification, and such modification as is considered within the scope of the appended claims is likewise considered within the spirit and intent of the invention.

What is claimed is:

1. A grading machine, including a grader frame, plow means carried by said frame, earth elevating means comprising a belt conveyor extending across said frame having its lower end adjacent said plow means and its upper end extending beyond the frame, a castor frame extending transversely beneath the conveyor and pivotally connected intermediate its ends to the grader frame, carrying pivotally mounted castor wheels mounted at opposite ends of the castor frame, a third castor wheel mounted at the rear of the frame adjacent the lower end of the conveyor, and means at the front end of the frame for attaching the same to a tractor member.

2. The combination with a grading machine as set forth in claim 1 of tractor means having a coupling frame secured to the grader frame by means of a horizontal pivot, said frames being provided with bumper plates on opposite sides of the pivot to maintain a sliding contact with one another in the various angular positions which the frames may assume with reference to one another.

3. In a grader machine or the like, a main supporting frame, tractor means having a coupling frame secured to the front end of said main frame, a horizontal pivot connecting said frames, contact members carried by said frames on opposite sides of said horizontal pivot, and supporting means for the grader frame comprising an elongated castor support, a horizontal pivot connecting said support to said main frame and extending substantially at right angles to the first mentioned horizontal pivot, castor wheels mounted on vertical pivots at opposite ends of said castor support, and a third castor wheel pivotally secured to said main frame at the rear end thereof and at a point substantially removed laterally from the horizontally pivoted castor support.

JOHN C. GRIFFITH.
WILLIAM O. WINSTON.